United States Patent [19]

Bennett

[11] Patent Number: 4,989,245
[45] Date of Patent: Jan. 29, 1991

[54] CONTROLLED AUTHORIZATION OF DESCRAMBLING OF SCRAMBLED PROGRAMS BROADCAST BETWEEN DIFFERENT JURISDICTIONS

[75] Inventor: Christopher J. Bennett, San Diego, Calif.

[73] Assignee: General Instrument Corporation, New York, N.Y.

[21] Appl. No.: 319,540

[22] Filed: Mar. 6, 1989

[51] Int. Cl.⁵ .............................................. H04K 9/00
[52] U.S. Cl. ........................................ 380/23; 380/20;
358/349; 340/825.31
[58] Field of Search ...................., 380/3, 4, 20, 29, 23,
380/25, 44, 45; 364/969, 969.4, 969.3, 968.7,
286.5; 340/825.31, 825.34, 825.33; 358/349

[56] References Cited

U.S. PATENT DOCUMENTS

| | | | |
|---|---|---|---|
| 4,323,922 | 4/1982 | den Toonder et al. | 380/20 X |
| 4,494,142 | 1/1985 | Mistry | 380/20 |
| 4,531,023 | 7/1985 | Levine | 380/23 X |
| 4,623,920 | 11/1986 | Dufresne et al. | 380/20 |
| 4,685,131 | 8/1987 | Horne | 380/20 |
| 4,712,238 | 12/1987 | Gilhousen et al. | 380/23 X |
| 4,736,422 | 4/1988 | Mason | 380/20 |
| 4,866,770 | 9/1989 | Seth-Smith et al. | 380/20 |

Primary Examiner—Thomas H. Tarcza
Assistant Examiner—Tod Swann
Attorney, Agent, or Firm—Edward W. Callan

[57] ABSTRACT

A control system and a corresponding method for controlling descrambling within a plurality of jurisdictions of scrambled programs broadcast from at least one of said jurisdictions. The control system includes a descrambler authorization system for each jurisdiction for providing authorization signals indicating whether descrambling of a predetermined program by descramblers located within the respective jurisdiction of the descrambler authorization system is authorized; means for distributing to a broadcast system the authorization signals pertaining to said predetermined program that are provided by the descrambler authorization systems for a plurality of said jurisdictions; a broadcast system for broadcasting a scrambled predetermined program and the distributed authorization signals pertaining to said predetermined program that are provided by the descrambler authorization systems for a plurality of said jurisdictions; and descramblers located in each jurisdiction for descrambling the scrambled predetermined program only when authorized by said broadcast authorization signals provided by the descrambler authorization system for the jurisdiction in which the descramblers are located. In order to enable a given jurisdiction to also regulate the export of scrambled programs by controlling the authorization of descramblers located in other jurisdictions for descrambling of programs broadcast from the given jurisdiction, the broadcast system includes means for also broadcasting a jurisdiction indication signal indicating the jurisdictions in which descrambling of the broadcast scrambled program is authorized; and the descramblers include means for processing the jurisdiction indication signal and for enabling descrambling of said predetermined program only when the jurisdiction indication signal indicates that descrambling of said program is authorized in the jurisdiction in which the descramblers are located.

8 Claims, 1 Drawing Sheet

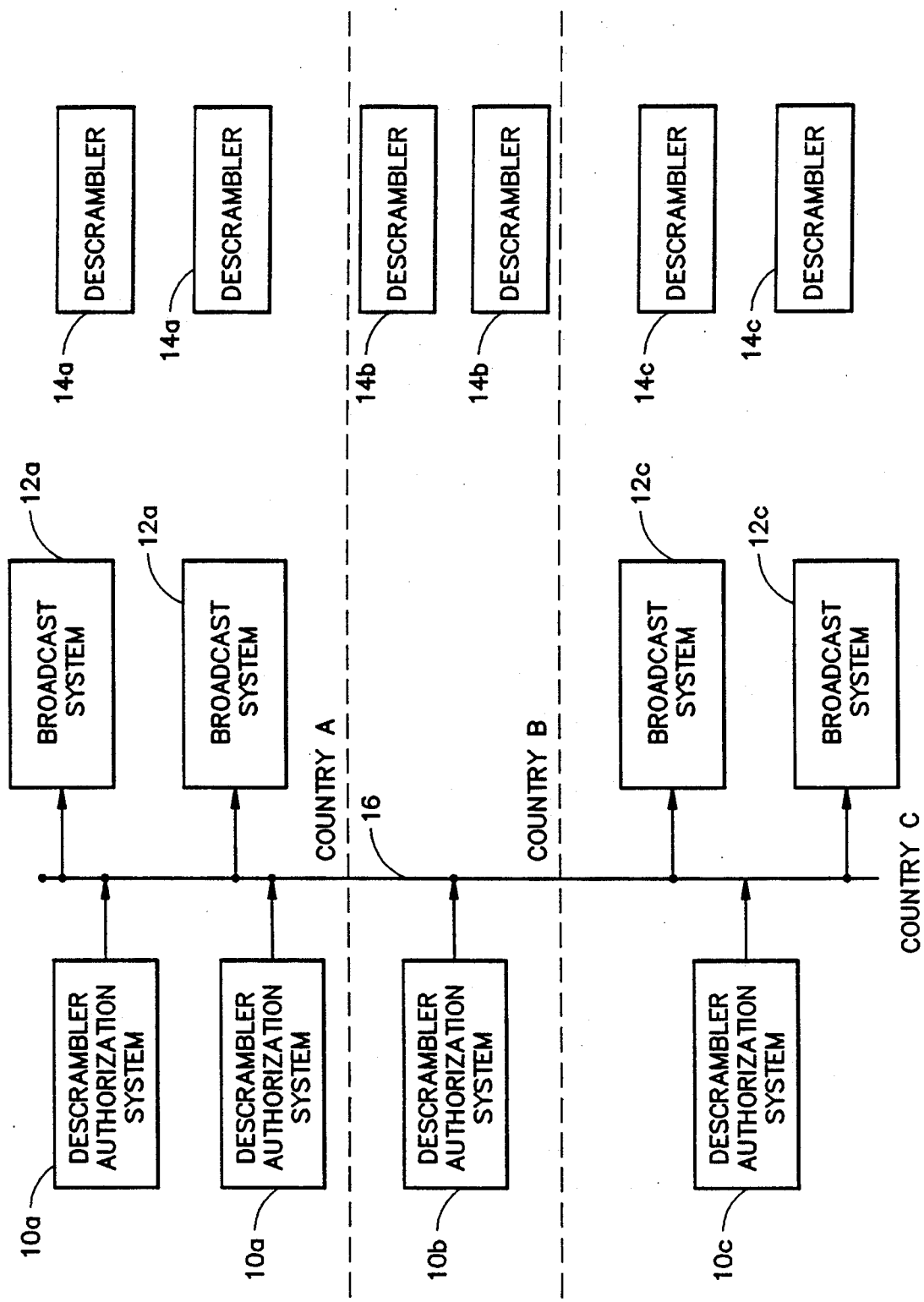

CONTROLLED AUTHORIZATION OF DESCRAMBLING OF SCRAMBLED PROGRAMS BROADCAST BETWEEN DIFFERENT JURISDICTIONS

BACKGROUND OF THE INVENTION

The present invention generally pertains to scrambled programming communication systems and is particularly directed to controlling the authorization of descrambling of scrambled programs.

In a system presently used in the United States of America for controlling descrambling of scrambled programs, a descrambler authorization system provides authorization signals indicating whether descrambling of predetermined programs by predetermined descramblers are respectively authorized; and a plurality of broadcast systems that broadcast scrambled programs also broadcast the authorization signals respectively pertaining to said programs that are provided by the descrambler authorization system. Descramblers are enabled for descrambling the broadcast scrambled programs only when authorized by the broadcast authorization signals provided by the descrambler authorization system.

SUMMARY OF THE INVENTION

The present invention provides a control system and a corresponding method for controlling descrambling within a plurality of jurisdictions of scrambled programs broadcast from at least one of said jurisdictions. A term "jurisdiction" refers to a country, a state, a group of countries, a group of states, or a region within a country or state. The system and method of the present invention enables a jurisdiction to regulate the importation of scrambled programs by controlling the authorization of descramblers located in such jurisdiction for descrambling of programs broadcast from outside such jurisdiction.

The control system of the present invention includes separate descrambler authorization systems for different jurisdictions for providing authorization signals indicating whether descrambling of a predetermined program by descramblers located within the respective jurisdiction of the descrambler authorization system is authorized; means for distributing to a broadcast system the authorization signals pertaining to said predetermined program that are provided by the descrambler authorization systems for a plurality of said jurisdictions; a broadcast system for broadcasting a scrambled predetermined program and the distributed authorization signals pertaining to said predetermined program that are provided by the descrambler authorization systems for a plurality of said jurisdictions; and descramblers located in each jurisdiction for descrambling the scrambled predetermined program only when authorized by said broadcast authorization signals provided by the descrambler authorization system for the jurisdiction in which the descramblers are located.

A preferred embodiment of the present invention enables a given jurisdiction to also regulate the export of scrambled programs by controlling the authorization of descramblers located in other jurisdictions for descrambling of programs broadcast from the given jurisdiction. In this embodiment, the broadcast system includes means for also broadcasting a jurisdiction indication signal indicating the jurisdictions in which descrambling of the broadcast scrambled program is authorized; and the descramblers include means for processing the jurisdiction indication signal independently of the authorization signal and for enabling descrambling of said predetermined program only when the jurisdiction indication signal indicates that descrambling of said program is authorized in the jurisdiction in which the descramblers are located.

A method according to the present invention of controlling descrambling of a broadcast scrambled program within a predetermined one of a plurality of jurisdictions, includes the steps of (a) providing an authorization signal for said predetermined jurisdiction indicating whether descrambling of a predetermined program by descramblers located within said predetermined jurisdiction is authorized; (b) distributing to a broadcast system within said predetermined jurisdiction the authorization signals pertaining to said predetermined program that are provided by the descrambler authorization systems for a plurality of said jurisdictions; (c) broadcasting a scrambled said predetermined program and said distributed authorization signals pertaining to said predetermined program that are provided for a plurality of said jurisdictions; and (d) descrambling said scrambled predetermined program only when authorized by the authorization signal provided for said predetermined jurisdiction.

To regulate export of scrambled programs, step (c) further comprises the step of (e) broadcasting a jurisdiction indication signal indicating the jurisdictions in which descrambling of said predetermined program is authorized; and the method further comprises the step of (f) processing the jurisdiction indication signal in the descramblers independently of the authorization signal and enabling descrambling of said predetermined program only when the jurisdiction indication signal indicates that descrambling of said predetermined program is authorized in the jurisdiction of the respective descramblers.

The present invention further provides a descrambler and a broadcast system for use in the control system of the present invention.

Additional features of the present invention are described in relation to the description of the preferred embodiments.

BRIEF DESCRIPTION OF THE DRAWING

The sole FIGURE of the Drawing is a block diagram of a control system according to the present invention.

DESCRIPTION OF THE PREFERRED EMBODIMENTS

Referring to the Drawing, a preferred embodiment of a multi-jurisdictional descrambling authorization control system includes descrambler authorization systems 10a, 10b, 10c, broadcast systems 12a, 12c and descramblers 14a, 14b, 14c respectively located in a plurality of different jurisdictions, Country A, Country B and Country C. In Country A there are a plurality of descrambler authorization systems 10a, a plurality of broadcast systems 12a and a plurality of descramblers 14a. In Country B there is a single descrambler authorization system 10b and a plurality of descramblers 14b. There are no broadcast systems in country B. In Country C there is a single descrambler authorization system 10c, a plurality of broadcast systems 12c and a plurality of descramblers 14c. There may a plurality of descrambler authorization system 10a within a given jurisdiction, as in Country A in order to facilitate separate management of different subscriber groups and/or different business systems that authorize descrambling to various subscriber groups. Depending upon business considerations within a given country descrambler authorizations signals for a given descrambler 14a within Country A could be provided by more than one descrambler authorization system 10a.

Each descrambler authorization system 10a, 10b, 10c provides authorization signals indicating whether descrambling of predetermined programs by descramblers 14a, 14b, 14c located within the respective jurisdiction of the descrambler authorization system is authorized. The predetermined programs may be those that are broadcast from outside the jurisdiction in which the descrambler authorization system 10a, 10b, 10c is located, as well as those that are broadcast from the same jurisdiction 10a, 10c as the one in which the descrambler authorization system 10a, 10c is located. U.S. Pat. No. 4,712,238 to Klein S. Gilhousen, Michael V. Harding, Jerrold A. Heller and Robert D. Blakeney, II, describes the provision of a descrambler authorization signal within a category rekey signal. The authorization message is authenticated with a subscriber key for each descrambler 14a, 14b, 14c within the jurisdiction of respective descrambler authorization system 10a, 10b, 10c that is authorized to descramble the predetermined scrambled program to which the descrambler authorization signal pertains.

These authorization signals are distributed over a virtual data bus 16 from the descrambler authorization systems 10a, 10b, 10c for all of the different countries A, B and C to all of the broadcasting systems 12a, 12c in the different Countries A and C. The virtual data bus 16 may be a satellite communication link or one or more communication lines. The authorization signals may be time-division multiplexed and/or may be provided over dedicated frequency channels.

Each broadcast system 12a, 12c scrambles and broadcasts predetermined programs and the distributed authorization signals pertaining to the predetermined programs that are provided by the descrambler authorization systems 10a, 10b, 10c for all of the different jurisdictions Country A, Country B and Country C. The authorization signals are contained within the category rekey messages that are contained within control messages broadcast with the scrambled programs, as described in the aforementioned U.S. Pat. No. 4,712,238 and in U.S. Pat. No. 4,613,901 to Klein S. Gilhousen, Charles F. Newby, Jr. and Karl E. Moerder. Each broadcast system 12a, 12c is operated by a given programmer.

In order to enable a given jurisdiction to regulate the export of scrambled programs by controlling the authorization of descramblers located in other jurisdictions for descrambling of programs broadcast from the given jurisdiction, each broadcast system 12a, 12c also broadcasts a jurisdiction indication signal indicating the jurisdictions in which descrambling of the broadcast scrambled program is authorized. The jurisdiction indication signal is included in a program mask which is contained within a program message that is broadcast for each predetermined scrambled program that is broadcast, as described in the aforementioned U.S. Pat. No. 4,712,238. The jurisdiction indication signal contains a number of bits that is at least at great as the number of different jurisdictions in which descrambling authorization is being controlled. For example, if there are 50 different jurisdictions, the jurisdiction indication signal is at least 50 bits in length. Each bit position corresponds to a different jurisdiction. A "1" bit in the bit position for a given country indicates that descrambling of the predetermined scrambled program is authorized in the given country.

Each of the descramblers 14a, 14b, 14c permanently stores a "1" bit in a bit position corresponding to the given country in which the descrambler is located, and includes a processor that compares the jurisdiction indication signal with the stored bit. When the jurisdiction indication signal indicates that descrambling of the predetermined program is authorized in the jurisdiction in which the descrambler is located, the comparison by the processor results in a match; and the processor enables the descrambler to descramble the predetermined program.

However, in order to descramble a predetermined scrambled program the descrambler 14a, 14b, 14c must also be authorized by the authorization signal for the predetermined program that is provided by the descrambler authorization system 10a, 10b, 10c for the jurisdiction in which the descrambler is located. The processing of an authenticated authorization signal by a descrambler in order to enable descrambling of a scrambled predetermined program is described in the aforementioned U.S. Pat. No. 4,712,238.

Because each jurisdiction has control over the descrambler authorization systems 10a, 10b, 10c and the broadcast systems 12a, 12c located in the respective jurisdiction, each jurisdiction can exercise control over which scrambled programs can be imported into such jurisdiction for descrambling and which scrambled programs can be exported from such jurisdiction for descrambling in other jurisdictions.

Within a given jurisdiction, such as Country C, descrambling of scrambled predetermined programs by the descramblers 14a, 14b, 14c located in a plurality of jurisdictions, Country A, Country B and Country C is controlled by a method that includes the steps of (a) providing an authorization signal for Country C indicating whether descrambling of a predetermined program by descramblers 14c located within Country C is authorized;

(b) distributing to the broadcast system 12c located within Country C the authorization signals pertaining to the predetermined program that are provided by the descrambler authorization systems 10a, 10b, 10c for all the the Countries A, B and C;

(c) broadcasting from within Country C a scrambled predetermined program and distributed authorization signals pertaining to the predetermined program that are provided by the descrambler authorization systems 10a, 10b, 10c for all of the countries A, B and C; and (d) descrambling the scrambled predetermined program with descramblers located in Country C only when authorized by the authorization signal provided for Country C.

To regulate export of a predetermined program from Country C, step (c) further comprises the step of (e) broadcasting from Country C a jurisdiction indication signal indicating the jurisdictions in which descrambling of the predetermined program is authorized; and the method further comprises the step of (f) processing the jurisdiction indication signal in the descramblers 14c and enabling descrambling of the predetermined program only when the jurisdiction indication signal indicates that descrambling of the predetermined program is authorized in Country C.

I claim:

1. A control system for controlling descrambling within a plurality of jurisdictions of a scrambled program broadcast from at least one of said jurisdictions, the system comprising
   separate descrambler authorization systems for different jurisdictions for providing authorization signals indicating whether descrambling of a predetermined program by descramblers located within the respective jurisdiction of the descrambler authorization system is authorized;
   means for distributing to a broadcast system the authorization signals pertaining to said predetermined program that are provided by the descrambler authorization systems for a plurality of said jurisdictions;
   a broadcast system for broadcasting a scrambled predetermined program and the distributed authorization signals pertaining to said predetermined program that are provided by the descrambler authorization systems for a plurality of said jurisdictions; and
   descramblers located in each jurisdiction for descrambling the scrambled predetermined program only when authorized by said broadcast authorization signals provided by the descrambler authorization system for the jurisdiction in which the descramblers are located.

2. A control system according to claim 1, wherein the broadcast system includes means for also broadcasting a jurisdiction indication signal indicating the jurisdictions in which descrambling of the scrambled predetermined program is authorized; and
   wherein the descramblers include means for processing the jurisdiction indication signal independently of the authorization signal and for enabling descrambling of said predetermined program only when the jurisdiction indication signal indicates that descrambling of said predetermined program is authorized in the jurisdiction in which the descramblers are located.

3. A control system according to claim 2, comprising a said broadcast system in each of a plurality of said jurisdictions.

4. A control system according to claim 1, comprising a said broadcast system in each of a plurality of said jurisdictions.

5. A descrambler for use in a control system that controls descrambling within a plurality of jurisdictions of a scrambled program broadcast from at least one of said jurisdictions, the system comprising a descrambler authorization system for each jurisdiction for providing authorization messages indicating whether descrambling of a predetermined program by descramblers located within the respective jurisdiction of the descrambler authorization system is authorized; means for distributing to a broadcast system the authorization messages pertaining to said predetermined program that are provided by the descrambler authorization systems for a plurality of said jurisdictions; and a broadcast system for broadcasting a scrambled predetermined program, the distributed authorization messages pertaining to said predetermined program that are provided by the descrambler authorization systems for a plurality of said jurisdictions, and a jurisdiction indication signal indicating the jurisdictions in which descrambling of the scrambled predetermined program is authorized, wherein the descrambler comprises
   means for descrambling the scrambled predetermined program only when authorized by said broadcast authorization messages provided by the descrambler authorization system for the jurisdiction in which the descrambler is located; and
   means for processing the jurisdiction indication independently of the authorization signal and for enabling descrambling of said predetermined program only when the jurisdiction indication signal indicates that descrambling of said predetermined program is authorized in the jurisdiction in which the descramblers are located.

6. A broadcast system for use in a control system that controls descrambling of a broadcast scrambled program within a plurality of jurisdictions, the system comprising a descrambler authorization system for each jurisdiction for providing authorization signals indicating whether descrambling of a predetermined program by descramblers located within the respective jurisdiction of the descrambler authorization system is authorized; means for distributing to a broadcast system the authorization signals pertaining to said predetermined program that are provided by the descrambler authorization systems for a plurality of said jurisdictions; and descramblers in each jurisdiction with each descrambler comprising means for descrambling a scrambled predetermined program only when authorized by said authorization signals provided by the descrambler authorization system for the jurisdiction in which the descrambler is located; and means for processing a broadcast jurisdiction indication signal independently of the authorization signal and for enabling descrambling of said predetermined program only when the jurisdiction indication signal indicates that descrambling of said predetermined program is authorized in the jurisdiction in which the descramblers are located, the broadcast system comprising
   means for broadcasting a scrambled predetermined program, the distributed authorization signals pertaining to said predetermined program that are provided by the descrambler authorization systems for a plurality of said jurisdictions, and a said jurisdiction indication signal indicating the jurisdictions in which descrambling of the scrambled predetermined program is authorized.

7. A method of controlling descrambling of a broadcast scrambled program by descramblers located within a plurality of jurisdictions, the method comprising the steps of
   (a) providing authorization signals for each jurisdiction indicating whether descrambling of a predetermined program by descramblers located within the respective jurisdiction is respectively authorized;
   (b) distributing to a broadcast system the authorization signals pertaining to said predetermined program that are provided for a plurality of said jurisdictions;
   (c) broadcasting a scrambled said predetermined program and the distributed authorization signals pertaining to said predetermined program that are provided for a plurality of said jurisdictions; and
   (d) descrambling the scrambled predetermined program only when authorized by an authorization signal provided for the jurisdiction in which the descrambler is located;
   wherein step (c) further comprises the step of (e) broadcasting a jurisdiction indication signal indicating the jurisdictions in which descrambling of said predetermined program is authorized; and wherein the method further comprises the step of (f) processing the jurisdiction indication signal independently of the authorization signal and enabling descrambling of said predetermined program only when the jurisdiction indication signal indicates that descrambling of said predetermined program is authorized in the jurisdiction in which the descrambler is located.

8. A method of controlling descrambling of a broadcast scrambled program within a predetermined one of a plurality of jurisdictions, comprising the steps of (a) providing an authorization signal for said predetermined jurisdiction indicating whether descrambling of a predetermined program by descramblers located within said predetermined jurisdiction is authorized;

(b) distributing to a broadcast system within said jurisdiction the authorization signals pertaining to said predetermined program that are provided by the descrambler authorization systems for a plurality of said jurisdictions;

(c) broadcasting a scrambled said predetermined program and said distributed authorization signals pertaining to said predetermined program that are provided for a plurality of said jurisdictions; and (d) descrambling said scrambled predetermined program only when authorized by the authorization signal provided for said predetermined jurisdiction;

wherein step (c) further comprises the step of (e) broadcasting a jurisdiction indication signal indicating the jurisdictions in which descrambling of said predetermined program is authorized; and wherein the method further comprises the step of (f) processing the jurisdiction indication signal in the descramblers independently of the authorization signal and enabling descrambling of said predetermined program only when the jurisdiction indication signal indicates that descrambling of said predetermined program is authorized in the jurisdiction in which the descrambler is located.

* * * * *